(12) United States Patent  (10) Patent No.: US 6,397,778 B1
Tripp  (45) Date of Patent: Jun. 4, 2002

(54) CAGED ENCLOSURE PET BED

(76) Inventor: Brenda Tripp, 5671 Clark Ford Rd., Ayden, NC (US) 28513

( * ) Notice: Subject to any disclaimer, the term of this patent is extended or adjusted under 35 U.S.C. 154(b) by 0 days.

(21) Appl. No.: 09/604,104

(22) Filed: Jun. 26, 2000

(51) Int. Cl.⁷ .............................................. A01K 29/00
(52) U.S. Cl. ..................................... 119/28.5; D30/118
(58) Field of Search ........................ 119/28.5; D30/118; 5/104

(56) References Cited

U.S. PATENT DOCUMENTS

| | | | | |
|---|---|---|---|---|
| 3,857,365 A | * | 12/1974 | Mueller | ..................... 119/28.5 |
| 4,550,456 A | * | 11/1985 | Allen | ............................. 5/104 |
| D294,752 S | | 3/1988 | Palier | ........................ D30/118 |
| 4,838,609 A | | 6/1989 | Christensen | ................ 297/277 |
| 5,072,694 A | | 12/1991 | Haynes et al. | ................ 119/19 |
| 5,161,484 A | | 11/1992 | Duane | ........................ 119/28.5 |
| 5,511,258 A | | 4/1996 | Barr, Sr. | ......................... 5/104 |
| D374,512 S | | 10/1996 | Kiley et al. | ................ D30/118 |
| 5,662,065 A | | 9/1997 | Bandimere et al. | ........ 119/28.5 |
| 5,860,489 A | | 1/1999 | Caldwell | .................... 119/28.5 |
| 5,960,739 A | * | 10/1999 | Storm | ........................ 119/28.5 |

FOREIGN PATENT DOCUMENTS

GB    2227401 A  *  8/1990

* cited by examiner

Primary Examiner—Peter M. Poon
Assistant Examiner—Judith A. Nelson
(74) Attorney, Agent, or Firm—Mills Law Firm PLLC

(57) ABSTRACT

A pet bed for a caged enclosure includes a support bedding platform that is suspended by a pair of chain linkages from opposed walls of the enclosure and above the floor thereof so as to permit normal periodic cleaning of the floor and provide a dry bedding area for the pet. The linkages may be connected to a common wall for the compact stowing of the bedding platform during non-use.

9 Claims, 5 Drawing Sheets

CAGED ENCLOSURE PET BED

FIELD OF THE INVENTION

The present invention relates to pet enclosure areas and, in particular, to a pet bed for caged enclosures that is suspended for keeping the bed area above washable surfaces and stowed against a cage wall when not in use.

BACKGROUND OF THE INVENTION

Various independent bedding products are available to pet owner for providing a comfortable resting area for their pets. Generally, such products are disposed on the floor of the household and the areas therearound do not require frequent cleaning. When cleaning is required, the beds may be conveniently moved elsewhere and repositioned when the area is dry.

For kenneled pets and other outdoor caged pets, the animal is confined to a limited area and accordingly regular surface cleaning, sometimes daily, is required. In such cases, removing the bedding product from the kennel area is not feasible. Moreover, particularly in commercial kennels, a multiple kennels may be cleaned simultaneously, further accentuating the difficulties of moving the bedding and preventing the same from becoming water saturated. Accordingly, most kennels do not permit or limit the types of bedding products the owners may provide during their pet's kenneling period.

After such cleaning, the kennel floor may remain wet or damp for considerable periods after cleaning thereby imposing discomfort and ill conditions on the pet. Thus while affording clean quarters, the pets comforts are necessarily compromised. To floor level conditions, primarily in residential settings, floor supported, elevated bedding platforms for pets have been proposed.

U.S. Pat. No. 5,161,484 to Duane discloses a raised pet bedding platform that may be mounted adjacent a vertical surface such as a bed. Once installed, the platform is not readily removed for storage or cleaning.

U.S. Pat. No. 5,860,389 to Caldwell discloses a frame supported raised support surface that may be removed for cleaning. While the frame may be shifted for cleaning thereunder, the pet bed is designed primarily for indoor residential use.

U.S. Pat. No. 5,072,694 to Haynes et al. discloses a wire frame, raised and tented platform for cats. The enclosure is floor supported and must be moved for cleaning the floor area. U.S. Pat. No. 5,662,065 to Bandimere et al. discloses a floor mounted peripheral frame covered by a fabric disposed in hammock fashion for supporting the animal above floor level.

U.S. Design Pat. No. D 374,512 to Kiley et al. disclosed a floor supported raised pet platform have a shade. While formed of sheet material and tubing, the platform occupies floor space and must be moved for cleaning the area. A similar approach is disclosed in U.S. Design Pat. No. D 294,752 to Palier.

It will thus be appreciated that the foregoing approaches are primarily intended for increasing pet comforts in residential settings and do not lend themselves into incorporation into confined pet environment that require cleaning on a frequent basis, oftentimes while the pet remains in the area. Such approaches also require dedicated floor space and cannot be readily removed in such a setting. Furthermore, the floor units would be susceptible to water spray during cleaning resulting in a wetted bedding area thereafter attractive to insects and other pests.

In view of the foregoing limitations of the prior art, it is an object of the present invention to provide a bedding area for pets that does not interfere with cleansing of the surrounding floor area.

A further object of the invention is to provide a suspended bedding area for a pet that does not interfere with cleaning in the area and may be readily stowed in the area when not in use.

Another object of the invention is to provide a suspended bedding platform for pets in caged or kennel environments wherein the platform may be suspended from the walls thereof and used by the pet during cleaning of the area.

Yet another object of the invention is to provide a suspended pet bed for use in confined quarters that affords the pet a dry comfortable area during normal operation of the quartering facility.

BRIEF SUMMARY OF THE INVENTION

The present invention fulfills the above and other desirable needs in the living quarters of confined pets by providing a padded sleeping platform that is suspended from the ceiling or walls of the living quarters sufficiently off the ground so as not to interfere with normal cleaning schedules and gives the pet a dry resting area while the washed surfaces are drying. To this end, a bedding frame is supported above floor level by a pair of flexible tethers, such as cables or chains or the like, at spaced vertical locations. A flexible bedding platform is attached to the frame adjacent the bottom thereof establishing a protective retaining wall for the pet. The pet bed is formed of moisture and scratch and bite resistant materials to protect against environmental and pet activity damage. When not in use, both tethers may be connected to a common surface permitting the collapsed platform to be stowed compactly thereagainst so as not to inhibit other activities in the area.

DESCRIPTION OF THE DRAWINGS

The above features and other objects and advantages of the present invention will become apparent upon reading the following detailed description taken in conjunction with the accompanying drawings in which.

DETAILED DESCRIPTION OF THE PREFERRED EMBODIMENTS

Figure 1:
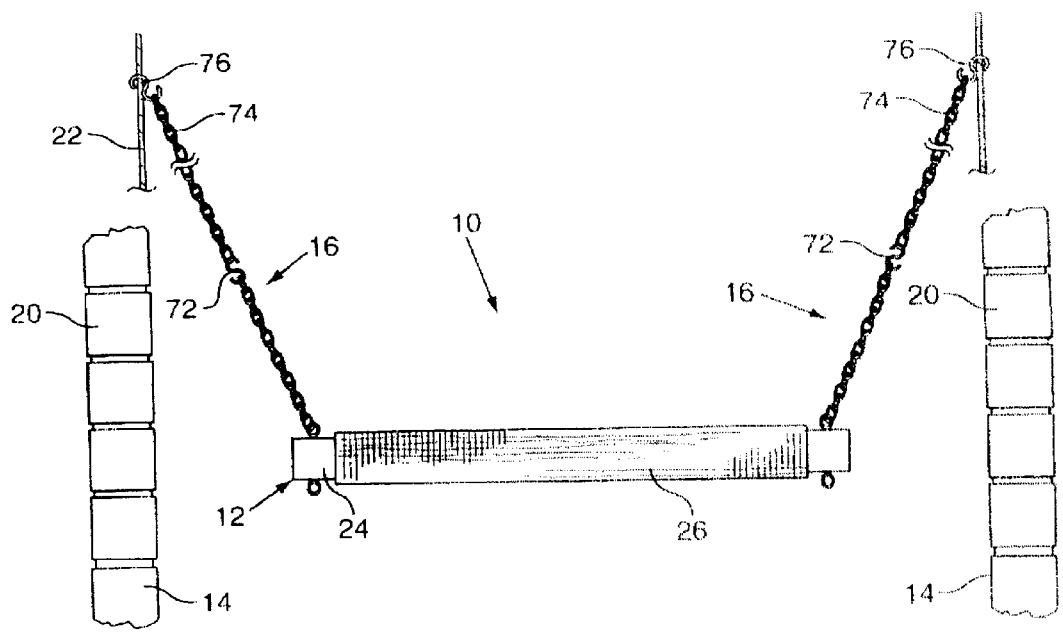
FIG. 1 is a front elevational view of a suspended pet bed tethered to the side walls of a caged enclosure in accordance with a preferred embodiment of the invention.

Referring to the drawings for purposes of describing the preferred embodiments only and not for limiting same, there is shown a suspended pet bed for use by quartered pets in a limited space environment such as a kennel, shelter, cage or like walled enclosure, although it will hereinafter become apparent that the invention may be beneficially employed in general residence settings for the comfort of the pet and handlers.

Such enclosures are typified by vertical peripheral walls surrounding a ground level area in need of regular cleaning. As illustrated, the walls may be fashioned of any suitable material such as a solid lower section and an upper wired mesh construction. Access to the enclosure is through a single door, and inasmuch as the enclosed space is limited, food and water bowls are suspended from the side walls and ground based bedding materials are generally not utilized. During cleaning the pet may remain in the enclosure, and consequent both the pet and washed areas need to be dried thereafter.

Figure 2:
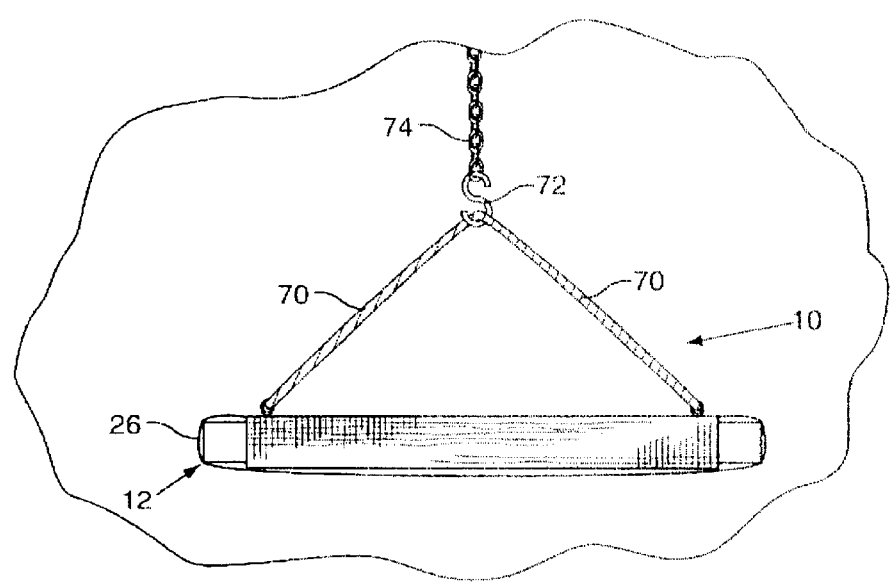
FIG. 2 is a fragmentary side elevational view of the pet bed shown in FIG. 1.
Figure 3:
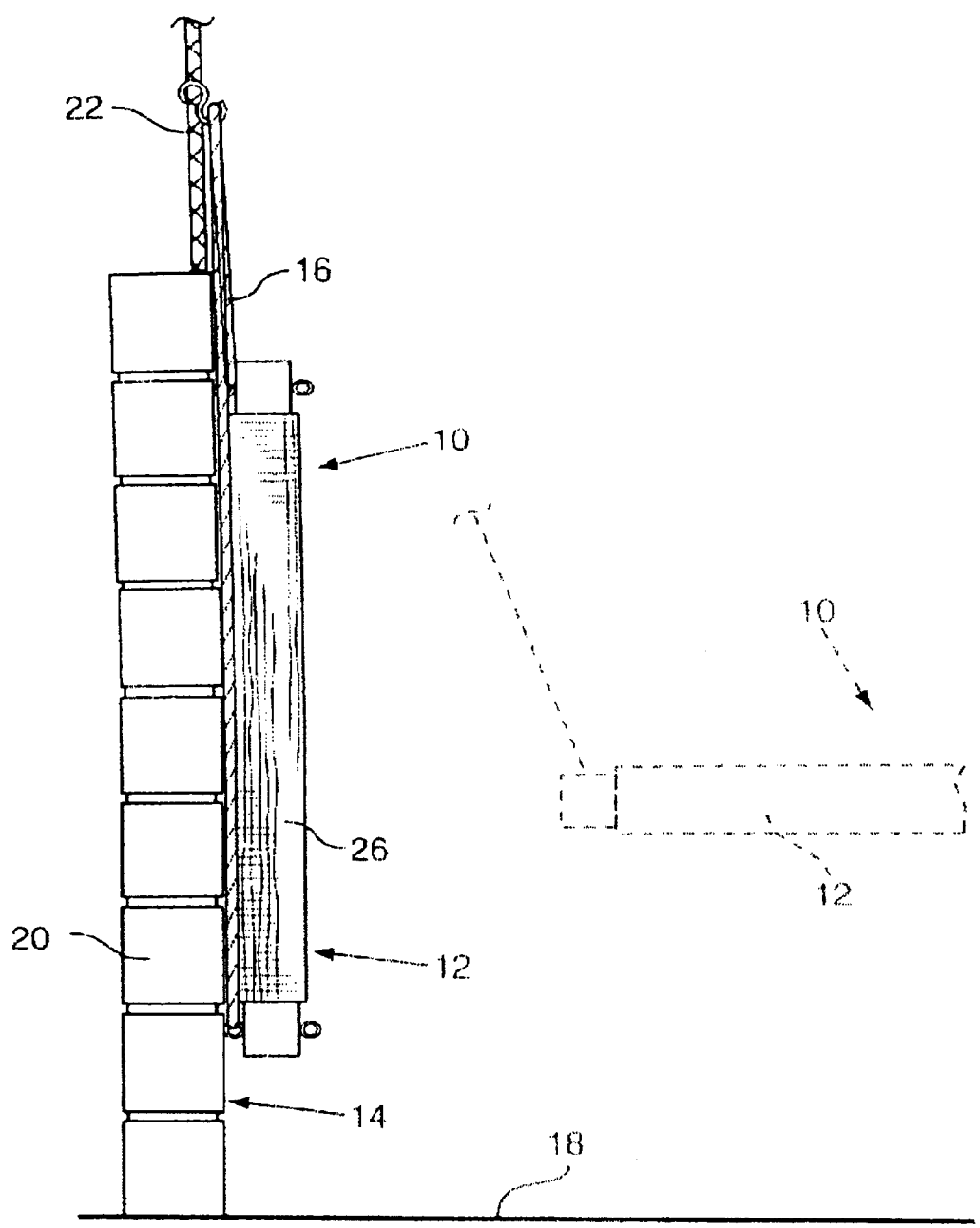
FIG. 3 is a fragmentary front elevational view of the pet bed in the stowed condition against a side wall of a caged enclosure.
Figure 4:
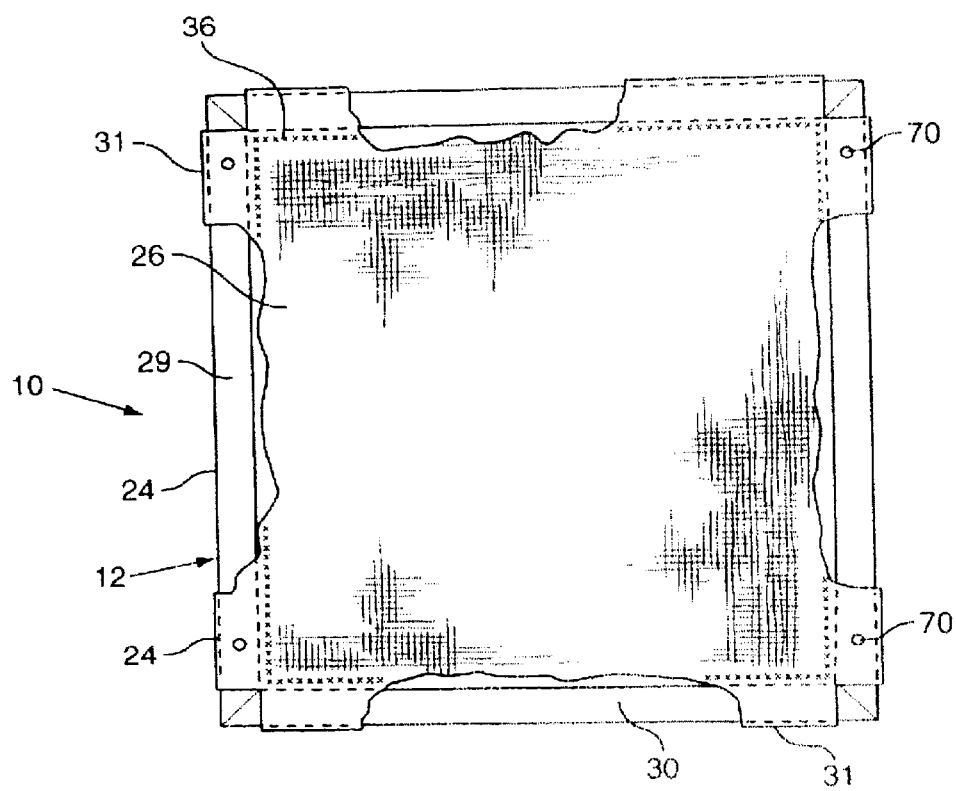
FIG. 4 is a top view of the pet bed.
Figure 5:
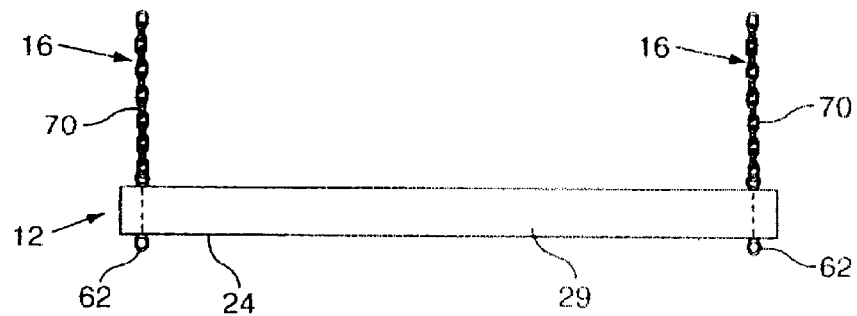
FIG. 5 is a side view of the pet bed with the platform cover removed.

Referring to FIGS. 1 through 3, a suspended pet bed 10 in accordance with the invention includes a generally rectangular bed platform 12 suspended from the side walls 14 of a caged enclosure by a pair of tethers 16. In use, the arrangement provides a limited clearance, 6 to 18 inches, above the enclosure floor 18, generally concrete or other impervious washable surface. The side walls 14 comprises a solid lower section 20, of brick or concrete, and an upper section 22 of wire fencing. In multiple pet facilities the enclosure space is limited, about 8 by 10 feet, and access limited to a single door. Periodically the floor 18 is hose washed and left to dry with the pet remaining in the space.

The platform 12 includes a rigid peripheral frame 24 and a cover 26 having a base 28 and lateral sleeves enclosing the side bars 29 of the frame. The cover 26 is formed of a flexible, light weight, washable fabric, such as canvas or like material. As described in greater detail below, the base 30 may include additional protective, reinforcing and/or padded layers. Padded cushions 31 may also be used for pet comfort.

Figure 7:
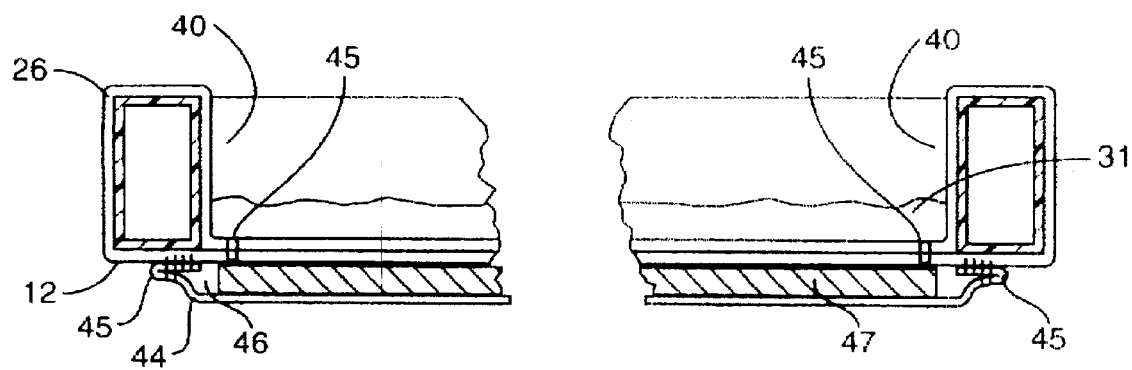
FIG. 7 is an enlarged cross sectional view taken along line 7—7 in FIG. 4.

The base 30 is substantially fits the interior of the frame and includes four side sleeves 31 that encircle the frame bars and are seam stitched as at 36 to the base 30 thereby defining open ended pockets for receiving the frame side bars 29. As shown in FIG. 7, the base 30 at the lower end of the frame and the frame and sleeves define inner peripheral walls 40, thus providing a protected recessed bedding area. Experience has shown that the walls 40 are extremely beneficial for keeping young nursing animals within the bed confines. To keep a stable base to prevent the nursing animals from sliding toward the center, a rectangular lower sleeve 44 is stitched at 45 on three sides of the base 30 to define an outwardly opening pocket 46. A reinforcing member 47 of plastic or other suitable material is received within the pocket thereby reinforcing the base and providing a stable surface for the nursing animals. This feature is particularly important in sheltered settings wherein nursing mothers and dependents are brought to or born in the facility.

Figure 8:
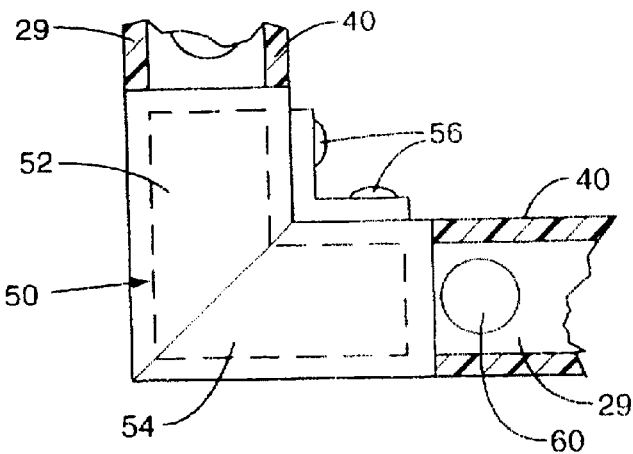
FIG. 8 is an enlarged fragmentary view of the corner construction for the pet bed support frame.

The frame 24 is formed of four mitered side bars of rectangular lightweight tubing, preferably PVC or like scratch and damage resistant material. A suitable size has been found to be around 1 inch by 2 inch with the major axis vertically oriented in assembly. Referring to FIG. 8, the inner side walls of the side bars 29 are joined together with a fastener assembly 50 including an L-shaped fastening block 52 disposed interior of the side bars and an L-shaped bracket 54 connected thereto by a plurality of fasteners 56.

While frames of the above construction have been found to work well in actual usage, it will be apparent that other framing materials and shapes could be used such as plastic and metallic pipes, wood or other lightweight structural materials providing the desired service characteristics and strength for the intended purposes.

Figure 6:
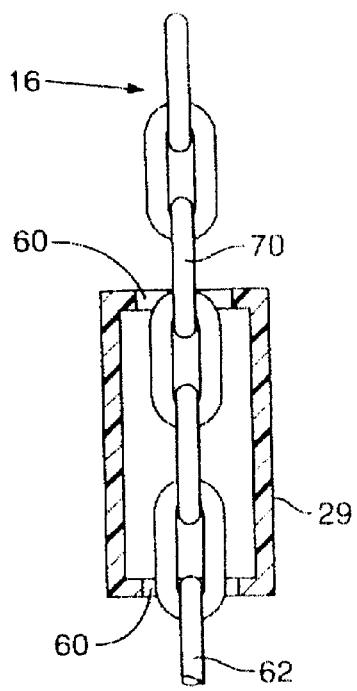
FIG. 6 is an enlarged cross sectional view taken along line 6—6 in FIG. 4.

Aligned holes 60 are formed in the top and bottom walls of the side bars at locations adjacent the comers and in opposed aligned relationship. As shown in FIG. 6, the lower triangular portion of the tether 16, in the form a chain links, has free ends that extend through the holes 60. The free ends are anchored against removal by enlarged snap hooks 62 or other suitable retention device. The ends 70 exiting upwardly and converge together at connecting link 72 thus presenting a triangular flexible load bearing lower linkage. The tether 16 includes an upper member 74 connected to lower linkage at link 72. Another S-hook 76 or other suitable fastener is used to connected the tether lines to the side walls of the enclosure for supporting the bed platform at varying elevations to position the pet a desired distance above the floor 18.

So installed, the pet bed 10 may be used at all times by the pet for dry comfortable bedding for themselves and dependents. The pet may safely remain on the bed during cleaning of the enclosure. When not is use, one of the tethers may be disconnected from its side wall and appropriately attached to the other side wall whereby the platform as shown in FIG. 3 will reside against the wall 14 in a stowed condition until future use. It will also be apparent that the pet bed may be supported from suitable ceiling structure. Moreover, while extremely beneficial in deployment in the enclosed environments, the comfort and advantages are likewise presented in residential settings.

Figure 9:
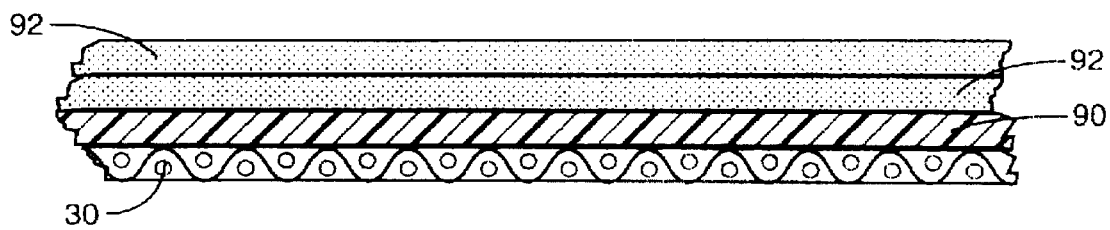
FIG. 9 is a fragmentary cross section of an embodiment of the cover base.

The cover 26 may also be suitably imprinted with designs or other indicia depending on the end user's desires. Additional features as illustrated in FIG. 9 may be incorporated into the cover including a water impervious layer 90 or additional padded layers 92. The resulting pet bed will provide convenience and comforts for handlers and pets alike.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed is:

1. In a caged enclosure for pets having a floor surrounded by peripheral walls including laterally spaced side walls, a bedding assembly for accommodating the pets without interfering with cleaning of the floor, comprising: a generally rectangular tubular frame formed of a lightweight damage resistant material, said tubular frame including laterally spaced side members connected with a front member and a rear member, a platform member formed of a moisture resistant flexible material having a base disposed interior of said tubular frame, said platform member including elongated side sleeves for slidably retaining side members of said tubular frame and front and rear sleeves for slidably retaining said front member and said rear member of said tubular whereby said base provides a supporting surface for the pet and said sleeves and the tubular frame provide a protective peripheral wall; a pair of flexible tethers each including a lower tether section and an upper tether section, each of said lower tether sections having lower terminal ends connected at spaced locations on opposed sides of the tubular frame; first connector means connected at one end to said lower tether section at substantially the middle thereof thereby establishing a generally triangular lower linkage for horizontally disposing said base and connected at the other end to the lower end of said upper tether section; second connector means connected to the upper ends of each of said upper tether sections, each of said upper ends connected in a normal position to opposite side walls of the enclosure and vertically spacing said tubular frame above said floor and in a storage position to a common one of said side walls thereby facilitating cleaning of said floor without water damage to said bedding.

2. The bed assembly as recited in claim 1 wherein said tethers comprise linked chain.

3. The bed assembly as recited in claim 1 wherein said tubular frame comprises rectangular plastic tubing.

4. The bed assembly as recited in claim 1 wherein said platform member is formed of a moisture resistant woven material.

5. The bed assembly as recited in claim 4 wherein an open ended sleeve is formed at a lower surface of the base defining an outwardly opening horizontal pocket and a reinforcing substrate is received within said pocket for stiffening said base.

6. The bed assembly as recited in claim 4 wherein said base includes a water impervious layer attached thereto.

7. The bed assembly as recited in claim 4 wherein said frame member comprises substantially equal length mitered sections of rectangular plastic tubing and bracket means structurally interconnect said mitered sections.

8. The bed assembly as recited in claim 7 wherein said lateral sleeves include lateral flaps that are wrapped around said frame and stitched to said base for supporting said cover on said platform member.

9. A method of improving periodic maintenance of a pet enclosure having peripheral walls including side walls having upper wire fencing sections and a floor requiring periodic cleaning while a pet is present, comprising the steps of: providing a generally rectangular platform having a rigid peripheral frame narrower than the distance between said side walls and a flexible base supported by said frame; attaching first flexible tether means at one end to one side of said peripheral frame; attaching second flexible tether means at one end to an opposed side of said peripheral frame; attaching said flexible tether means to opposed walls of said enclosure at vertical locations in said upper wire fencing sections effective to suspend said platform above said floor during pet occupancy and during said periodic cleaning; and attaching said first and said flexible tether means to said wire fencing sections on a common wall of said enclosure at locations effective to stow said platform against said common side walls during periods of non-use.

* * * * *